(12) United States Patent
Petrosyan et al.

(10) Patent No.: US 7,751,641 B2
(45) Date of Patent: Jul. 6, 2010

(54) METHOD AND SYSTEM FOR DIGITAL IMAGE ENHANCEMENT

(75) Inventors: Arsen Petrosyan, Sterling, VA (US); Artavazd Ghazaryan, Washington, DC (US)

(73) Assignee: Imagenomic, LLC, Alexandria, VA (US)

( * ) Notice: Subject to any disclaimer, the term of this patent is extended or adjusted under 35 U.S.C. 154(b) by 1166 days.

(21) Appl. No.: 11/116,408

(22) Filed: Apr. 28, 2005

(65) Prior Publication Data

US 2006/0245666 A1      Nov. 2, 2006

(51) Int. Cl.
   *G06K 9/40* (2006.01)
   *G06K 9/48* (2006.01)

(52) U.S. Cl. ...................... 382/266; 382/199

(58) Field of Classification Search .................. 382/254, 382/266, 275, 199, 191, 205
See application file for complete search history.

(56) References Cited

U.S. PATENT DOCUMENTS

| | | | |
|---|---|---|---|
| 5,271,064 A * | 12/1993 | Dhawan et al. | 382/266 |
| 6,195,467 B1 * | 2/2001 | Asimopoulos et al. | 382/261 |
| 6,408,109 B1 * | 6/2002 | Silver et al. | 382/300 |
| 6,415,053 B1 * | 7/2002 | Norimatsu | 382/199 |
| 6,445,832 B1 * | 9/2002 | Lee et al. | 382/266 |
| 6,738,527 B2 * | 5/2004 | Kuwata et al. | 382/266 |
| 2002/0118301 A1 * | 8/2002 | Persiantsev | 348/578 |

* cited by examiner

*Primary Examiner*—Yon Couso
(74) *Attorney, Agent, or Firm*—Morrison & Foerster LLP (57) ABSTRACT

Disclosed systems and methods for enhancing digital images to reduce visual noise and artifacts. In particular, the systems and methods include detecting information edges in images and processing an image at different spatial frequencies.

14 Claims, 6 Drawing Sheets

Fig. 4 a. Gradient Mask 1 e. Gradient Mask 5 b. Gradient Mask 2 f. Gradient Mask 6 c. Gradient Mask 3 g. Gradient Mask 7 d. Gradient Mask 4 h. Gradient Mask 8

METHOD AND SYSTEM FOR DIGITAL IMAGE ENHANCEMENT

FIELD OF INVENTION

The present invention relates to method and systems for digital image enhancement that includes visual noise and artifact reduction in digital images and results in faster image processing performance and improved picture quality.

BACKGROUND OF THE INVENTION

Digital images are often plagued with noise such as artifacts and other degradations. For many different applications, one wants to remove the noise and enhance the image so as to bring out features of the image while at the same time suppressing noise and other artifacts that in general degrade the image. Accordingly, a variety of image enhancement techniques have been developed.

One such technique is the so-called Wiener filtering technique which is a method that involves taking a Fourier transform of an image and generating a linear filter function to modify the Fourier transform coefficients by either increasing them or decreasing them at every frequency.

Limitations in this method have lead to the development of other visual enhancement techniques. For example, U.S. Pat. No. 5,526,446 to Adelson et. al. describes a method to enhance digital images by converting an image into a set of coefficients in a multi-scale image decomposition process, followed by modification of each coefficient based on its value and the value of coefficients of related orientation, position, or scale, which is in turn followed by a reconstruction or synthesis process to generate the enhanced image.

However, a need still exists for an image enhancement technique that improves image quality and achieves faster image processing performance than known image enhancing techniques.

SUMMARY OF THE INVENTION

Described are systems and methods for enhancing digital images to reduce visual noise and artifacts. The systems and methods include detecting information edges in images and processing an image at different spatial frequencies.

In once embodiment, the method of enhancing an image at information edges includes determining whether a pixel of interest in an image is an edge pixel by comparing the pixel of interest to other pixels around the pixel of interest, assigning a gradient to a pixel determined to be an edge pixel by comparing the edge pixel to other pixels in the image at specific directions, and enhancing the image utilizing the pixel's gradient.

Preferably, the method also includes enhancing the image at a plurality of spatial frequencies to produce a plurality of enhanced images. Preferably, the plurality of enhanced images are blended into a single image. Preferably, lower frequency enhanced images are converted into higher frequency images prior to blending.

Preferably, the luminance (Y), red chrominance (Cr) or blue chrominance (Cb) of the image is enhanced. Preferably, the gradient is assigned to a pixel determined to be an edge pixel using a series of directional masks. Preferably, the determination of whether a pixel of interest is an edge pixel utilizes a series of masks that surround the pixel of interest. Preferably, the non-edge pixels are enhanced. Preferably, the enhancement of the non-edge pixels occurs only at a single spatial frequency.

Another embodiment is a method of enhancing an image at different spatial frequencies. The method includes obtaining an image at a first spatial frequency and a second spatial frequency, enhancing the image at the first frequency to produce a first enhanced image, enhancing the image at the second frequency to produce a second enhanced image, and blending the first enhanced image with the second enhanced image.

Yet another embodiement is a method of a method of enhancing an image at different spatial frequencies that includes obtaining an image at a first spatial frequency and a second spatial frequency, comparing pixels of interest at the first spatial frequency to other pixels at the first spatial frequency to determine whether the pixels of interest are edge pixels, assigning a gradient to a pixel determined to be an edge pixel by comparing the edge pixel to other pixels in the image at specific directions, enhancing edge pixel at the first frequency to produce an enhanced image, and blending the enhanced image at the first frequency with the image at the second frequency.

DESCRIPTION OF THE DRAWINGS

The invention can be understood by reference to the Detailed Description of the Invention when taken together with the attached drawings, wherein.

DETAILED DESCRIPTION OF THE INVENTION

Described are systems and methods for enhancing digital images to reduce visual noise and artifacts. The systems and methods achieve superior image quality and faster image processing performance than typical image enhancing methods. These methods can be used to provide image enhancement for a variety of digital images.

The methods and systems enhance the edge details in an image in order to achieve superior image quality and faster processing times. The concept of the edge details can be explained with respect to a simple example of a bird on a plain blue sky background.

If you took a picture of an empty sky on a sunny day when there were no clouds and, for simplicity, we assume that there is no difference in tonality or color intensity of the sky, all you would see is one, very blue image. Now, imagine that you managed to capture the image of a flying bird (or a plane for that matter) on this sky background. If the bird is very far away, the bird would appear uniformly-colored, black, for example. In other words since the bird appears to be of uniform color you would not be able to distinguish any small details (i.e. feathers) or color differences within the bird. As a result, the only visual information available for defining the bird is the contour line that defines the shape of the bird against the blue sky background. In other words, we can detect the bird because there is "sufficient" difference between the edge lines of the two subjects (the sky and the bird).

When a camera captures an image, not all the information contained in the image after it is captured by the camera represents the actual information available at the time the photo was taken. The variation between the captured image and the actual image is due to various constraints such as the environmental conditions and the changes introduced by the image acquisition device. In other words, all of the resulting image pixels potentially hold "extra" information as represented by their luminance and color values.

By conducting spatial analysis of the image pixels, pixels that have had "significant" alterations from what they should be can be determined and corrected. As described herein, alterations in a captured image can be determined by identifying actual edge lines that represent objects within the image and injected edge lines that represent noise.

The basic unit of spatial information in a captured digital image is a single pixel represented by its luminance and color values. In addition to this high-frequency spatial data, lower frequency information can be obtained by aggregating information over multiple pixels or pixel groups.

To better illustrate the effect of different spatial frequencies, imagine a large high-way billboard with an advertisement that you can observe from different distances. Now, imagine you are standing right next to it looking straight ahead at a section of the billboard. At a distance of about 10 inches you would be able to clearly see right in front of you the individual pixels that comprise a portion of the billboard image. However, you would have difficulty in seeing how these pixels fit into the entire picture. Now, if you moved 300 feet away you can see the full picture of the advertisement but you cannot distinguish the smaller details let alone the individual pixels. Effectively, the perceived visual information at 300 feet is an aggregate representation of all pixels because of the distance between the subject (the billboard) and your acquisition device (your eye).

Accordingly, lower frequency information is preferably obtained by averaging the value of a group of adjacent pixels. The larger the group of pixels that are averaged, the lower information frequency.

For example, in one embodiment each frequency component is defined via a transform that replaces the original individual pixels with transformed pixels. The values of the transformed pixels are obtained by averaging a block of pixels. For example, in a 2×2 transform each block of 2×2 pixels is replaced with a pixel whose value is the average value of the pixels in the 2×2 block. Preferably, a lower 2×2 frequency image is prepared by transforming the complete original captured image with transformed pixels. Preferably, the order in which the pixels are transformed is by starting with a pixel block in the upper left corner and moving from left to right, row by row until all pixels in the original captured image are transformed.

Other frequency information can be obtained by averaging different size blocks. Preferred frequency blocks conform to the following Equation (1):

formula $n \times n$ (where $n$ is $2^k$ and $k >= 1$) pixel squares    Equation (1)

Preferred frequencies in accordance with formula 1 include, 2×2, 4×4 and 8×8. Effectively, each frequency represents a downscaled version of the original image.

Preferably, multiple frequency images are developed for each visual channel of information in the original captured image. Preferred visual channels include: luminance (Y), red chrominance (Cr) and blue chrominance (Cb).

For each frequency image a structural analysis is employed to identify visual information. Generally speaking, for a given pixel, we define its visual information as the difference between the pixel's characteristic (i.e. luminance or color) and the respective characteristic of its local neighborhood of pixels. The larger the difference, the more visual information that the pixel carries.

Preferably, a threshold difference is used to classify each pixel. If the difference between the pixel's visual characteristic and its neighboring pixels is equal or greater than the threshold value, the pixel is classified as an edge pixel. Edge pixels represent the edge lines of a specific visual characteristic as detected at the selected threshold level.

An edge pixel is defined for each channel separately; hence the same pixel can be an edge pixel in the luminance channel and a non-edge pixel in one of the color channels. However, as edge pixels can be determined in the same manner for each visual channel, reference to edge pixels herein refers to edge pixels of any visual channel, for example (Y), (Cr), or (Cb).

Preferably, several classes of edge pixels are determined for each visual channel to reflect the degree of difference ("edginess") between the edge pixels themselves. Also, preferably an edge pixel gradient is determined which indicates the direction of the edge line at each pixel location. This gradient can be computed based on the values of other edge pixels in the neighborhood of the pixel of interest.

Figure 1:
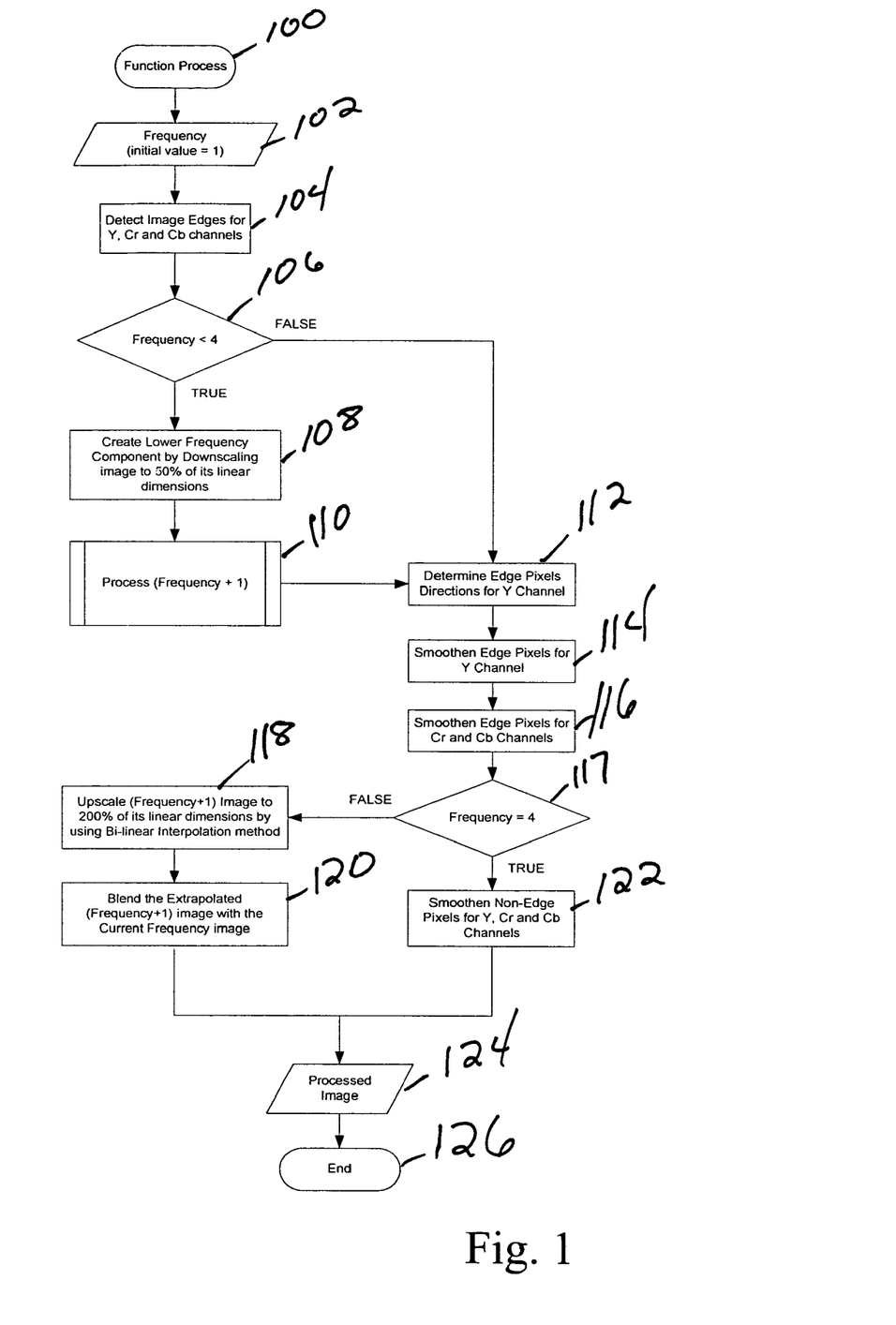
FIG. 1, is a flow chart of one embodiment of an image enhancement method.

FIG. 1 is a flow chart of one embodiment of a method of enhancing digital images to reduce visual noise and artifacts utilizing four different image frequencies. The process 100 begins with an image with an initial frequency of 1 at 102. Next, edge pixels within the image with the frequency of 1 are identified for each of the visual channels (Y, Cr and Cb) at 104. At 106 it is determined whether the frequency is less than 4. If the image frequency is less than 4, a lower frequency image of frequency +1 is produced from the image frequency component by downscaling the initial frequency image at 108 the process then returns to 100, where the edges are now detected at 104 for the new downscaled image. This process repeats until four frequency images 1, 2, 3 and 4 are produced and image edges are detected at all four frequencies. Once edges are detected for all visual channels and at all four different frequencies, the edge pixel gradient is determined for all visual channels and all frequencies at 112.

The edge pixel gradient is the direction of the edge line as determined by edge pixels detected in 104. The edge pixel gradients are first utilized at 114 to smoothen the edge pixels in the luminance (Y) channel for each frequency image at 114 and then to smoothen the edge pixels for the color channels (Cr and Cb) for each frequency image at 116.

At 117, the higher frequency images 1, 2 and 3 proceed to 118 and 120, where they are blended with an image of one lower frequency. For example, for an image with a frequency of 3, the process proceeds to 118, where the image of the current frequency +1, which would equal frequency 4, is upscaled to the same frequency of frequency 3. The two images now at the same frequency 3 are then blended at 120. Once all frequencies are blended in this manner, a process image is produced at 124, which includes edge pixel enhancements at all four frequencies. Enhancements of non-edge pixels, which contain less information and therefore are less important, occur at only the lowest frequency at 122.

The specifics of the steps described in FIG. 1 are described below with regard to Examples 1-8.

An example of how edge and non-edge pixels are originally assigned in an image is provided in Example 1:

EXAMPLE 1

Determining Edge Pixels

In one embodiment edge pixels are broken down into four different edge pixel classes $E_1$, $E_2$, $E_3$ and $E_4$. In addition, there is a fifth non-edge pixel class hereinafter denoted N. $E_1$ is defined as the "strongest" edge pixel and $E_4$ is defined as the "weakest" edge pixel. Further, a threshold value denoted by T is assigned.

Figure 2:
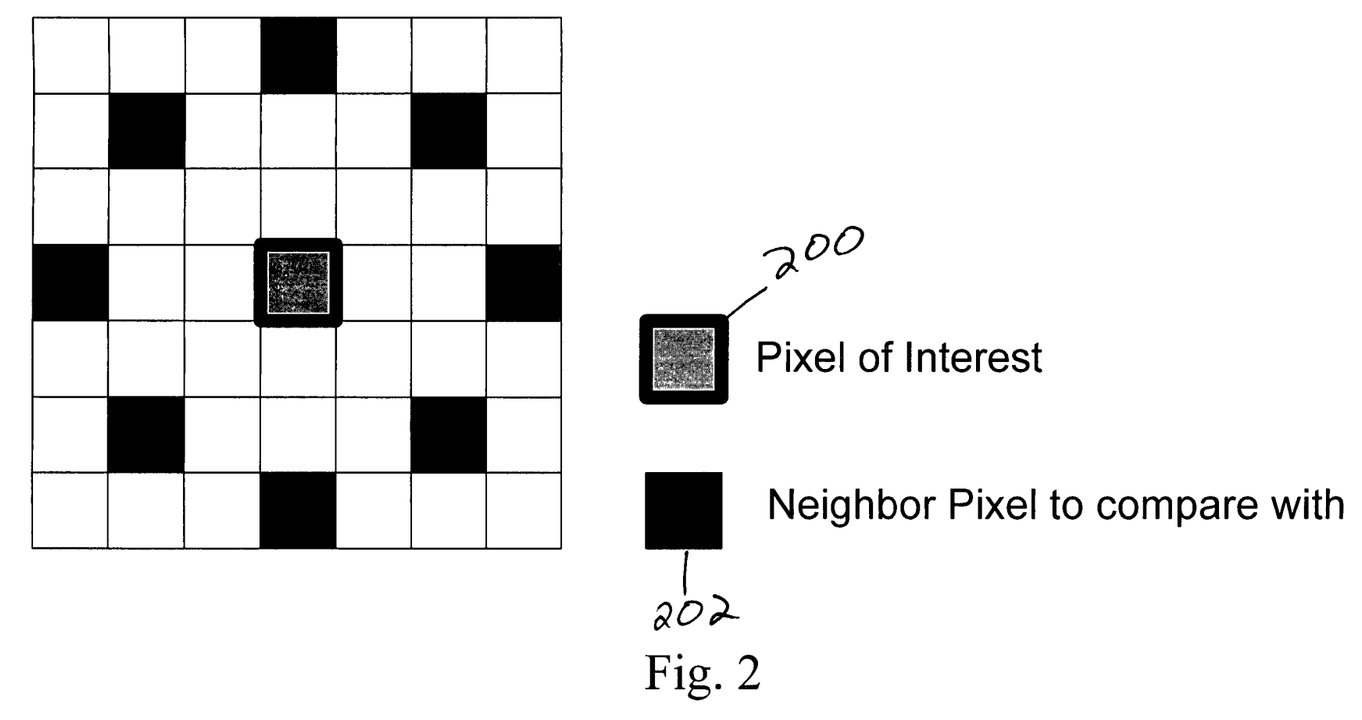
FIG. 2 is a diagram showing how a pixel of interest is compared to neighboring pixels to determine whether the pixel of interest is an edge pixel.

In FIG. 2, the specific value of a pixel of interest 200 is compared to the values of at least one of its eight neighboring pixels 202. As shown in FIG. 2, the neighboring pixels 202 that are compared to the pixel of interest 200 need not be adjacent pixels. If the difference between the pixel of interest and one or more neighboring pixels is greater than one half of the threshold T, the pixel of interest is labeled as a $E_1$ pixel; if the difference is greater than one quarter of the threshold but less than one half of the threshold, mark it as a $E_2$ pixel.

Once edge pixels are determined by comparing pixels of interest to neighboring pixels, pixels that are mislabeled as edge or non-edge pixels are identified and relabeled. Preferably edge pixels are relabeled as edge pixels and singular edge pixels are relabeled as non edge pixels. One embodiment of a method of fixing mislabeled edge and non-edge pixels is provided in Example 2.

EXAMPLE 2

Fixing Broken Edge Pixels and Eliminating Singular Edge Pixels

Figure 3:
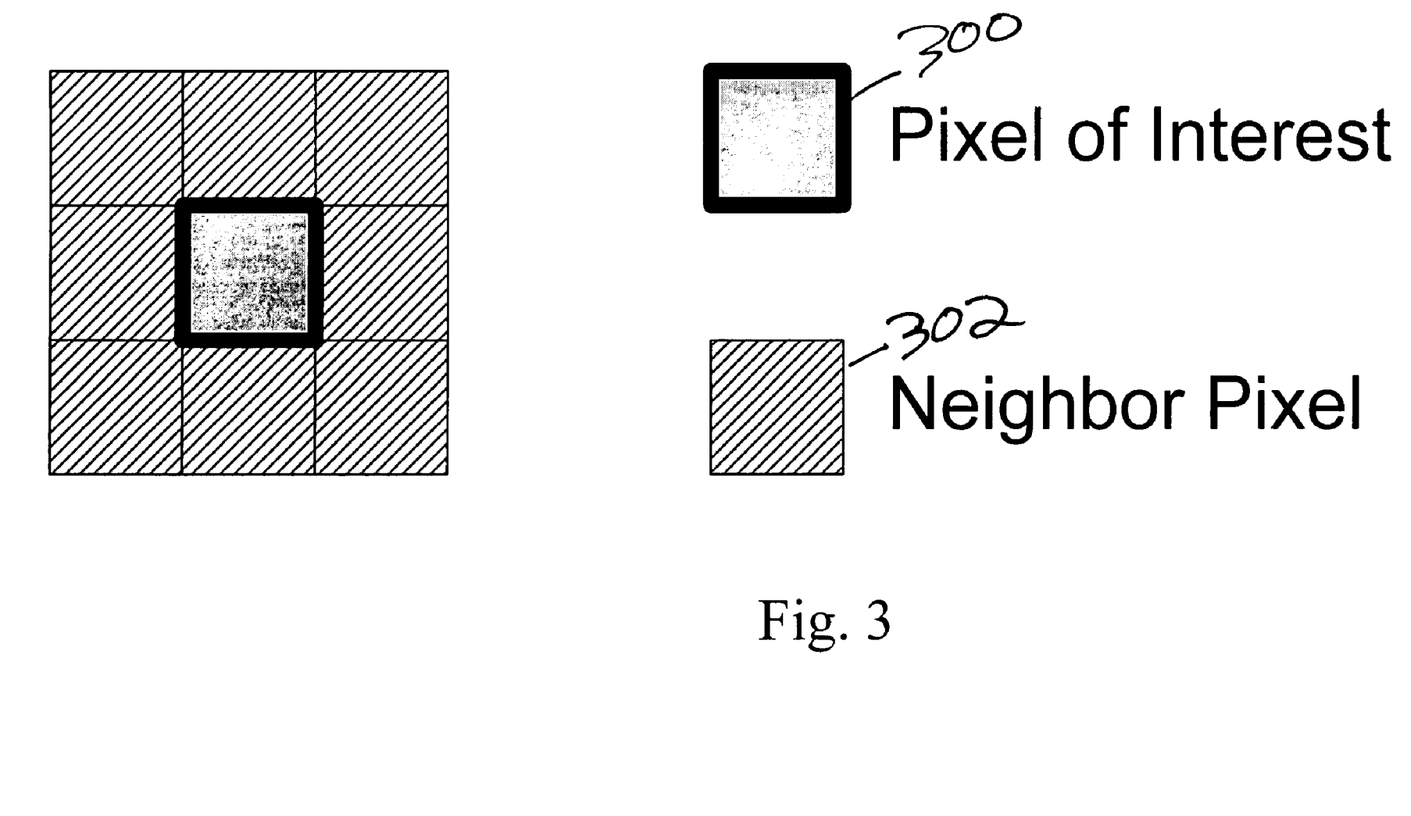
FIG. 3 is a diagram that shows how an edge pixel of interest can be compared with adjacent edge pixels.

One method of identifying mislabeled edge and non edge pixels is to compare the labeled pixel of interest to adjacent pixels. For example, in FIG. 3 for a pixel of interest 300 the number of adjacent $E_1$ and $E_2$ edge pixels is calculated. If the pixel of interest is not an $E_1$ or $E_2$ pixel and there are more than three $E_1$ and $E_2$ pixels, the pixel of interest should probably be an edge pixel so the pixel of interest is relabeled as an $E_2$ pixel. If the pixel of interest is an $E_1$ or $E_2$ pixel and there is none or only one other adjacent $E_1$ or $E_2$ pixel, the pixel of interest is probably % not an edge pixel so the pixel of interest is relabeled as an N (non-edge) pixel.

After mislabeled pixels are corrected individually, clusters of mislabeled edge pixels are identified and corrected. We define an edge pixel cluster as a concentrated group of edge pixels. A cluster represents noise, and is therefore mislabeled, if the cluster's size is less than a predetermined value. A preferred method of identifying the size of a pixel cluster is by applying a series of masks to around the edge pixel of interest.

If no edge pixels are found in a one pixel border of a mask that surrounds the edge pixel of interest, the cluster is smaller than the mask. Preferred masks are square shaped, but the masks could be any shape. An example of identifying and eliminating mislabeled edge pixel clusters is provided in Example 3.

EXAMPLE 3

Eliminating Mislabeled Edge Pixel Clusters

An edge cluster is considered to represent noise if the cluster's size in both dimensions is less than 16 pixels. In other words, the smallest image detail is assumed to have a size of at least 16 pixels in at least one dimension. It will be recognized that other cluster sizes can be chosen by a user.

To eliminate these clusters or noise "blotches", each edge pixel of interest is incrementally surrounded with a series of square masks, for example, starting with a 5×5 mask (for a single pixel's immediate neighborhood) to a 15×15 mask. During this process, if no edge pixels appear in a one-pixel border of any of these successive square masks, all pixels within the mask are marked as non-edge N pixels.

Figure 4:
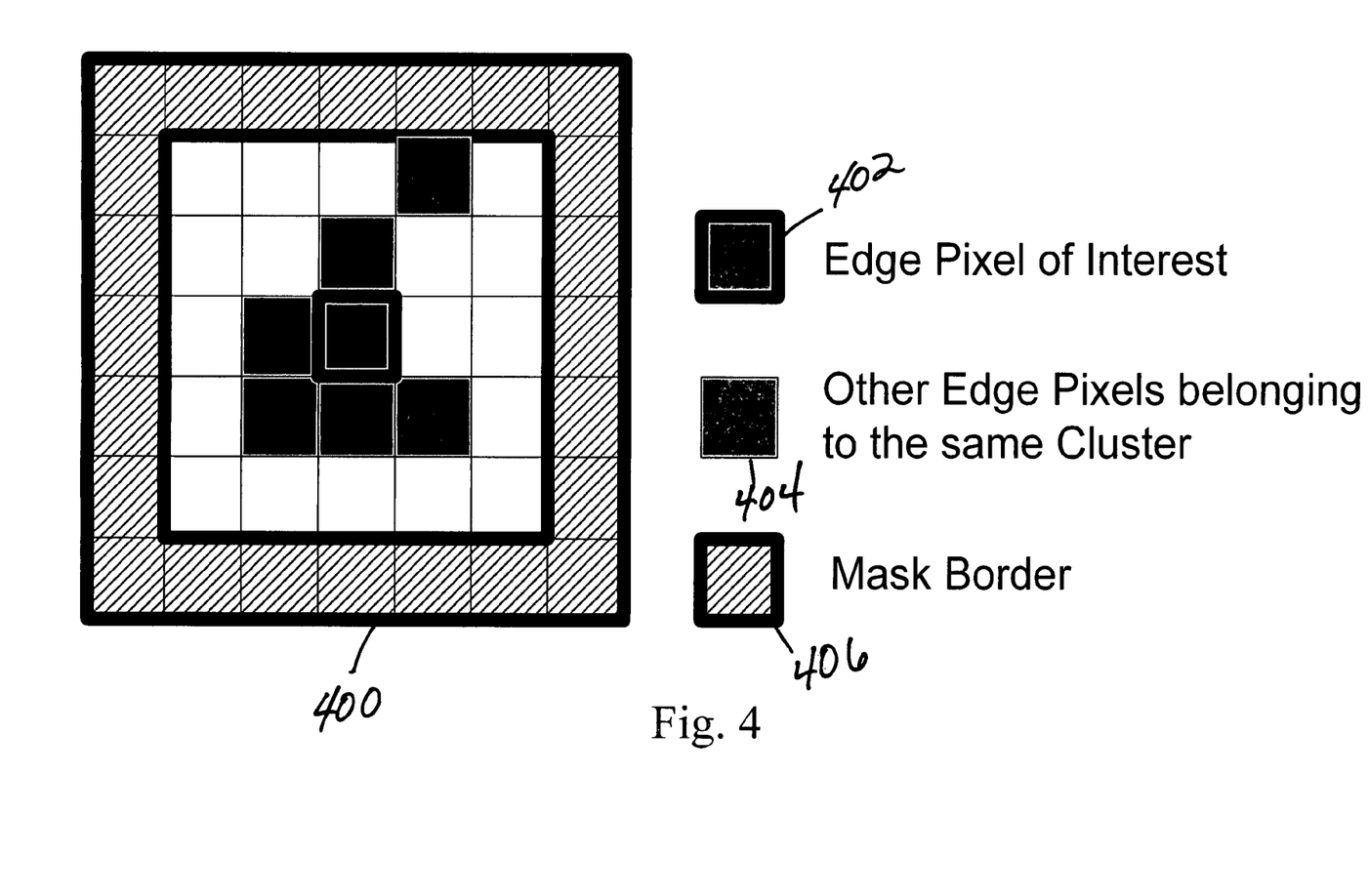
FIG. 4 is diagram of a 7×7 mask that surrounds an edge pixel of interest.

For example, FIG. 4 shows a 7×7 mask 400 that surrounds an edge pixel of interest 402. If the mask border 406, which is the one pixel edge of the mask 400, includes any other edge pixels 404, then we know that the cluster is larger than 7 pixels and we progress to the next mask, an 9×9 mask. If no edge pixels appear in the mask border 406, the edge pixel of interest 402 and all other edge pixels 404 within the mask are marked as non-edge N pixels.

Pixels around identified edge pixels also have a higher probability of containing more visual information than other non edge N pixels. Accordingly, non edge pixels that are adjacent to edge pixels should also be marked as edge pixels, but of a lower class. Example 4 shows how non-edge pixels that that are adjacent to edge pixels are relabeled as edge pixels.

EXAMPLE 4

Edge "Cushioning"

For an edge pixel of interest, we mark any adjacent pixels N pixels as an edge pixel one-class lower than the pixel of interest ($E_{k+1}$, k=1,2). In other words, if the edge pixel is an $E_1$ pixel, all non-edge neighbor pixels as marked as $E_2$. This procedure is repeated for all initially and newly marked $E_2$ pixels to define the $E_3$ pixels. Analogously, the same procedure is repeated for newly marked $E_3$ to define $E_4$ pixels. The $E_4$ edge pixels are preferably only defined for the color channels (Cr and Cb).

Next, the direction of the edge is determined for each edge pixel of interest. Example 5 shows how the edge direction or gradient can be initially determined for each edge pixel of interest. Example 6 shows a method of correcting how the initial gradient is checked and corrected by comparing the gradient for each pixel to the gradient of neighboring pixels.

EXAMPLE 5

Determining Initial Edge Pixel Direction

As shown in FIGS. 5a-5h, eight edge directions or gradients are defined within a 9×9 pixel mask. For an edge pixel of interest the difference in the pixel of interest's value and each pixel in each mask is calculated. We then aggregate the square value of the differences for each mask and select the mask whose aggregated value is the smallest. The resulting mask corresponds to the gradient which is assigned to the edge pixel of interest. Equation (2) summarizes how the gradient G is determined for each $p_i$.

$$G = \min_{k=1\ldots8} \sum_{i=1\ldots8} (P_0 - P_{ik})^2 \quad \text{Equation (2)}$$

Wherein G is the gradient, $P_0$ is the value of each pixel in a chosen mask and $P_{ik}$ is the value of the i pixel of interest in the k mask.

A gradient can be determined for each value of a pixel including luminance and color values.

EXAMPLE 6

Correcting the Edge Pixel Gradient

For each edge pixel of interest, the gradient of all adjacent edge pixels are looked at. The gradient mask that includes the maximum number of adjacent pixels is then selected. For example, in FIG. 5 if 4 adjacent pixels are assigned gradient mask 2, 2 adjacent pixels are assigned gradient mask 3, and 2 adjacent pixels are assigned gradient mask 4, gradient mask 2 is selected. The number of adjacent pixels that have the selected gradient is compared to the number of adjacent pixels that have the same gradient as the pixel of interest. If these two numbers differ we then change the direction of the pixel of interest to the selected direction. This method of corrected edge pixels is preferably done for each edge pixel starting from the upper left of the image and working from left to right and down the image.

Once gradient values have been assigned to each pixel, the information edges are preferably enhanced by the gradient values as shown in Example 7.

EXAMPLE 7

"Smoothing" the Luminance and Color Values of the Edge Pixels

Figure 5:
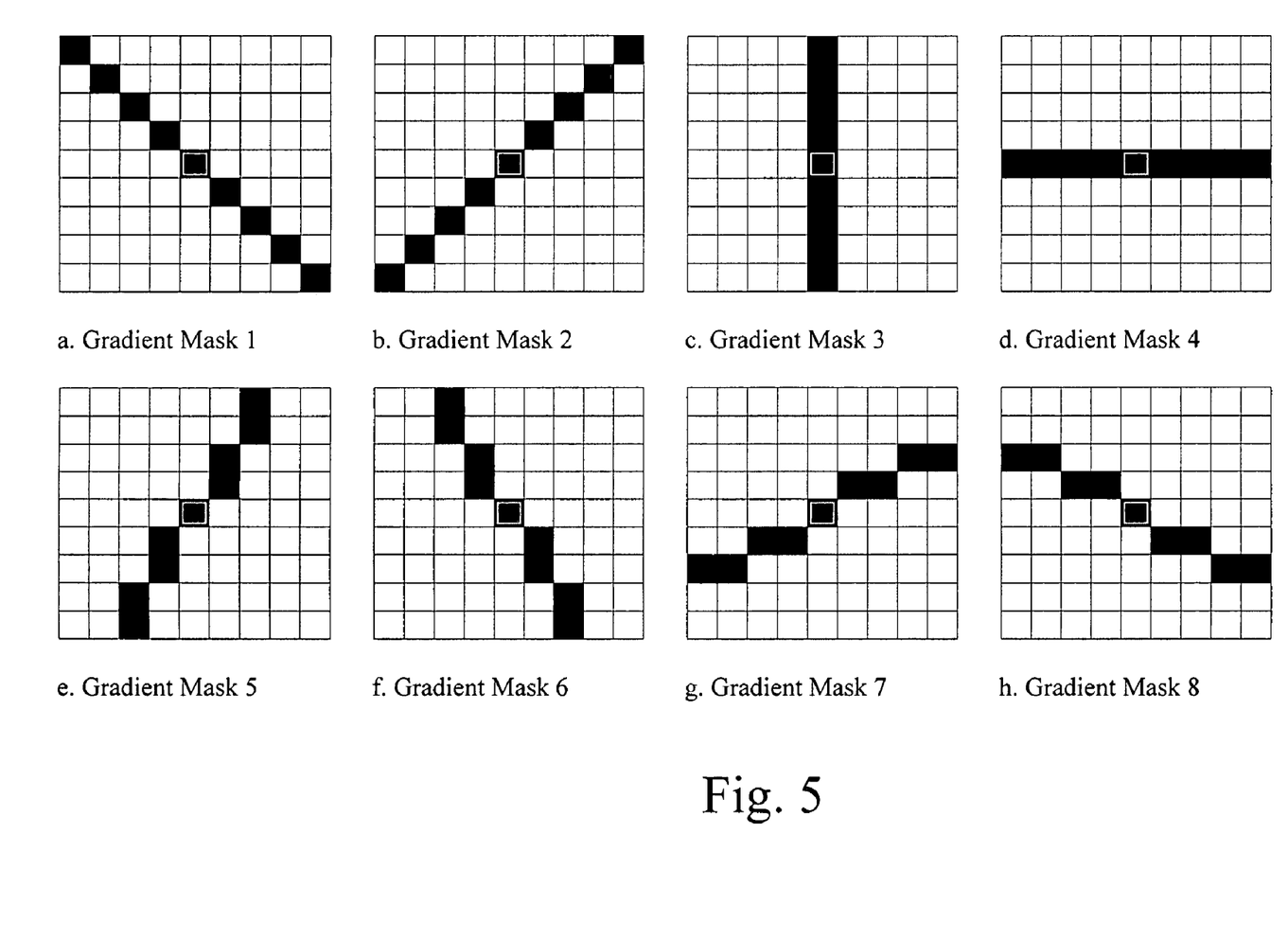
FIGS. 5a-5h, show eight gradient masks that surround an edge pixel of interest for determining the gradient of the edge pixel of interest and smoothening the luminance value of an edge pixel of interest.

The luminance and color values are "smoothed" by calculating the weighted average of the pixel values in the direction determined by the pixel's assigned gradient value assigned above. For example, we apply one of the gradient masks shown in FIG. 5 to the edge pixel of interest and calculate the difference between the luminance values of the edge pixel of interest and each pixel in the mask according to Equation (3). Again, which of the eight gradient masks is used is determined according to the pixel's gradient value.

$$D_k = |Y_o - Y_k| \quad \text{Equation (3)}$$

Where $Y_o$—is the luminance value of the edge pixel of interest and $Y_k$ is the luminance value of k-pixel in the mask If $D_k$ is lower than a threshold value ($T_{lum}$) then the luminance value is multiplied by the luminance value of the mask pixel and the difference of $T_{lum}$ and $D_k$ to calculate the weighted value of the mask pixel according to Equation (4).

$$W_k = Y_k * (T_{lum} - D_k) \quad \text{Equation (4)}$$

Once we have the weighted value of all mask pixels we calculate the "smoothened" value of the edge pixel of interest, by summing together all of the weighted values calculated in Equation (4) according to the following Equation (5):

$$L'_0 = \frac{\sum_k W_k}{\sum_k (T_{lum} - D_k)} \quad \text{Equation (5)}$$

Where $L'_o$ is the smoothed luminance value.

According to this method of smoothing luminance values, the smoothed luminance value is a weighted average of the luminance values of all pixels within a 9×9 mask that surrounds the pixel of interest that do not differ from the pixel of interest by more than a threshold value $T_{lum}$.

Figure 6:
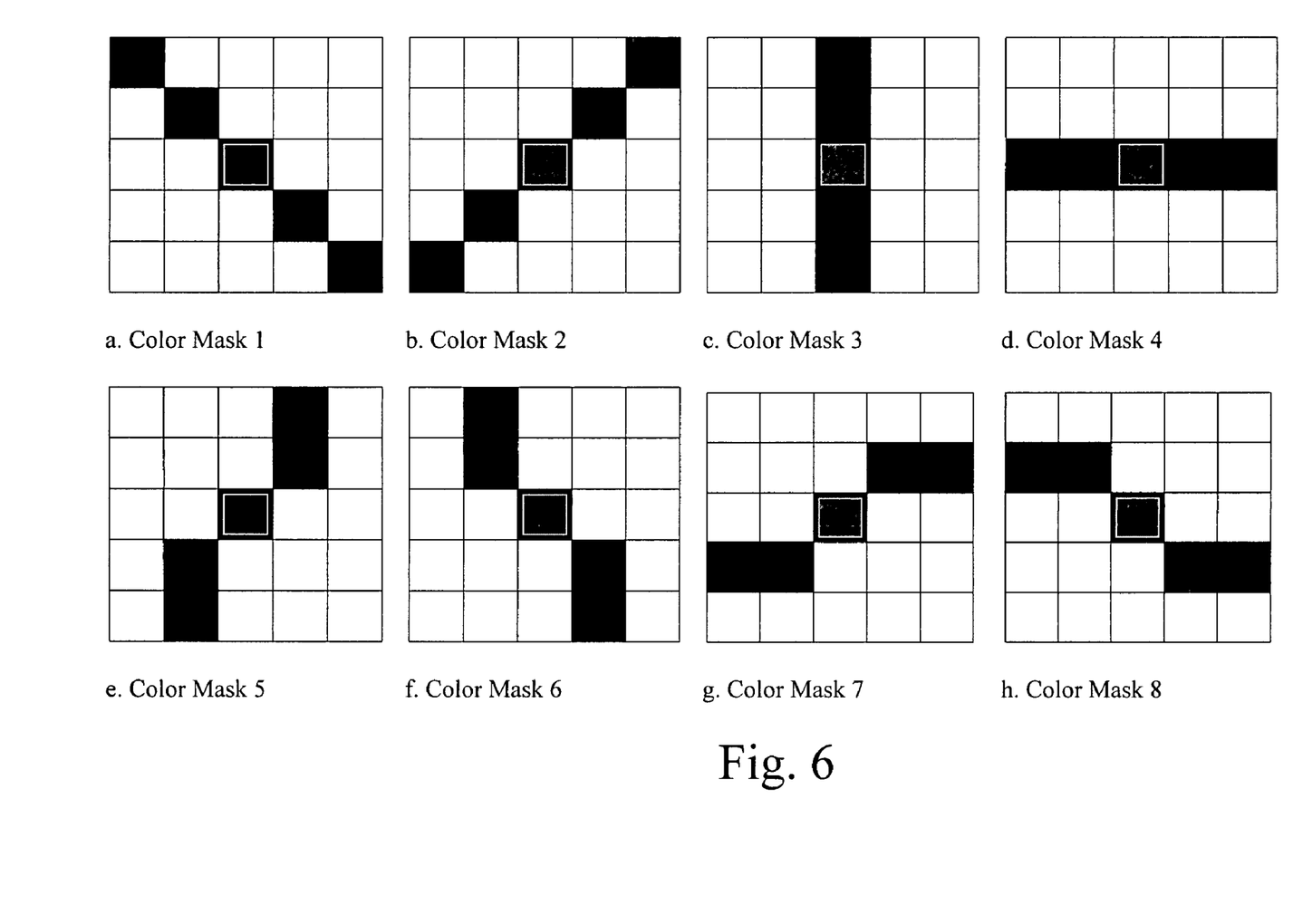
FIGS. 6a-6h show eight gradient for smoothing the color value of an edge pixel of interest.

The smoothening of the color values or other pixel value characteristics are performed in the same manner as for the luminance values by applying corresponding direction masks. Preferably, the luminance values are corrected using, for example, 9×9 masks as shown in FIG. 5 and color values are corrected using smaller masks, for example the 5×5 masks shown in FIG. 6.

Once the edge pixels are smoothed for each image frequency, for example according to the processes in Example 7, non-edge pixel smoothening is preferably performed. Since non-edge pixels contain less information and therefore are less important, preferably smoothing is performed only for the lowest frequency component of the captured image. The smoothening process is preferably similar to the edge pixel smoothening. Preferably, the mask applied to non-edge pixel of interest during the smoothing process is a smaller mask applied during the smoothing process 3×3 square mask instead of a 9×9 and 5×5 masks.

As explained above, preferably, the smoothing of edge pixels is performed on a captured image that is rendered at a variety of frequencies. Preferably, the smoothing of edge pixels is performed on a captured image rendered on at least two, more preferably, at least four different frequency images.

Once all of the different frequency images are smoothed, the images are preferably, combined back together to form an enhanced image. Example 8 shows a method of combining different frequency images using bi-linear extrapolation.

EXAMPLE 8

Combining Different Frequency Images to produce a Processed Image

To combine a low frequency component with those of a higher frequency component, we first perform bi-linear extrapolation for the low frequency components to upscale the low frequency components to the same frequency as the high frequency component.

Once the low frequency component is converted to the same frequency as the high frequency component, the edge values of the pixels at the original high frequency component are analyzed. If the pixel is a non-edge pixel then its value is replaced by the extrapolated value of the low frequency component. If the pixel is an $E_3$ pixel in the luminance channel then only a quarter of its luminance value is retained and the other three quarters are replaced by the extrapolated luminance value. If the pixel is an $E_2$ pixel in the luminance channel then half of is luminance value is retained and the other half is replaced by the extrapolated value. If the pixel is an $E_1$ pixel then the one eighth of its luminance value is replaced by the extrapolated value.

For the color channels the weight is preferably determined according to the following rule: an $E_1$ pixel retains its value, an $E_2$ pixel retains three quarters of its value, an $E_3$ pixel retains half and an $E_4$ pixel retains one eighth of its value.

If the image was processed at more than two frequencies, the process in Example 8 can be repeated for each image frequency. For example, if the image is processed at four frequencies 1-4, with 1 being the lowest frequency and 4, being the highest frequency, frequency 4 can be combined with frequency 1, then frequency 2 and then frequency 3 according to the process in Example 8.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein.

This application discloses numerical range limitations. Persons skilled in the art will recognize that the numerical ranges disclosed inherently support any range within the disclosed numerical ranges even though a precise range limitation is not stated verbatim in the specification because this invention can be practiced throughout the disclosed numerical ranges and at other numerical ranges which persons skilled in the art will find this invention operable.

Other embodiments and uses of the invention will be apparent to those skilled in the art from consideration of the specification and practice of the invention disclosed herein. All references cited herein, including all U.S. and foreign patents, patent applications, all publications and other documentary materials, are specifically and entirely hereby incorporated by reference.

What is claimed is:

1. A method of enhancing an image at information edges comprising:
    determining utilizing a processor whether a pixel of interest in an image is an edge pixel by comparing the pixel of interest to other pixels around the pixel of interest;
    assigning, utilizing the processor, a gradient to a pixel determined to be an edge pixel by comparing the edge pixel to other pixels in the image at specific directions utilizing a series of directional masks, wherein the gradient indicates a direction of an edge line at a location of the pixel determined to be an edge pixel; and
    enhancing the image utilizing the pixel's gradient utilizing the processor, and further enhancing the image at a plurality of spatial frequencies to produce a plurality of enhanced images.

2. The method of claim 1, further comprising blending the plurality of enhanced images into a single image.

3. The method of claim 2, wherein lower frequency enhanced images are converted into higher frequency images prior to blending.

4. The method of claim 1, wherein the luminance (Y), red chrominance (Cr) and blue chrominance (Cb) of the image are enhanced.

5. The method of claim 1, wherein the determination of whether a pixel of interest is an edge pixel utilizes a series of masks that surround the pixel of interest.

6. The method of claim 1, further comprising of enhancement of non-edge pixels.

7. The method of claim 6, wherein enhancement is applied to non-edge pixels at only a single spatial frequency.

8. A method of enhancing an image at different spatial frequencies comprising:
    obtaining an image at a first spatial frequency and a second spatial frequency utilizing a processor;
    enhancing the image at the first frequency to produce a first enhanced image utilizing the processor, wherein said enhancing comprises assigning a gradient to a pixel determined to be an edge pixel by comparing the edge pixel to other pixels in the image at specific directions utilizing a series of directional masks, wherein the gradient indicates a direction of an edge line at a location of the pixel determined to be an edge pixel;
    enhancing the image at the second frequency to produce a second enhanced image utilizing the processor; and
    blending the first enhanced image with the second enhanced image utilizing the processor.

9. The method of claim 8, wherein enhancing the image at the first frequency comprises comparing pixels of interest at the first spatial frequency to other pixels at the first spatial frequency to determine whether the pixels of interest are edge pixels.

10. The method of claim 9, wherein the determination of whether a pixel of interest is an edge pixel utilizes a series of masks that surround the pixel of interest.

11. The method of claim 8, wherein the luminance (Y), red chrominance (Cr) and blue chrominance (Cb) of the image are enhanced.

12. A method of enhancing an image at different spatial frequencies comprising:
    obtaining an image at a first spatial frequency and a second spatial frequency utilizing a processor;
    comparing pixels of interest at the first spatial frequency to other pixels at the first spatial frequency to determine whether the pixels of interest are edge pixels utilizing the processor;
    assigning a gradient, utilizing the processor, to a pixel determined to be an edge pixel by comparing the edge pixel to other pixels in the image at specific directions utilizing a series of directional masks, wherein the gradient indicates a direction of an edge line at a location of the pixel determined to be an edge pixel;
    enhancing edge pixel at the first frequency to produce an enhanced image utilizing the processor; and
    blending the enhanced image at the first frequency with the image at the second frequency utilizing the processor.

13. The method of claim 12, wherein the determination of whether a pixel of interest is an edge pixel utilizes a series of masks that surround the pixel of interest.

14. The method of claim 12, wherein the luminance (Y), red chrominance (Cr) and blue chrominance (Cb) of the image are enhanced.

* * * * *